(12) United States Patent
Leone

(10) Patent No.: US 10,578,038 B2
(45) Date of Patent: Mar. 3, 2020

(54) METHOD AND SYSTEM FOR SECONDARY AIR INJECTION COORDINATION WITH EXHAUST BACK PRESSURE VALVE

(71) Applicant: Ford Global Technologies, LLC, Dearborn, MI (US)

(72) Inventor: Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1184 days.

(21) Appl. No.: 14/312,323

(22) Filed: Jun. 23, 2014

(65) Prior Publication Data

US 2015/0369101 A1    Dec. 24, 2015

(51) Int. Cl.
*F02D 41/02* (2006.01)
*F01N 3/20* (2006.01)

(52) U.S. Cl.
CPC ......... *F02D 41/025* (2013.01); *F01N 3/2006* (2013.01); *F02D 41/0255* (2013.01)

(58) Field of Classification Search
CPC .... F01N 3/2006; F01N 3/2033; F02D 41/025; F02D 41/0255; F02D 41/064; F02D 2200/0802; F02D 2250/34
USPC ................................... 123/406.12
See application file for complete search history.

(56) References Cited

U.S. PATENT DOCUMENTS

| 5,379,586 | A  | * | 1/1995  | Honji   | F01N 3/0807 60/276 |
| 6,155,043 | A  | * | 12/2000 | Zhang   | F01N 3/2006 60/284 |
| 6,546,721 | B2 | * | 4/2003  | Hirota  | F01N 3/0821 60/278 |
| 6,751,949 | B2 | * | 6/2004  | Tamura  | F01N 3/2006 60/284 |
| 6,769,245 | B2 | * | 8/2004  | Itoh    | F01N 3/021 60/278 |
| 8,364,379 | B2 | * | 1/2013  | Johnson | F02D 9/04 123/323 |
| 8,555,615 | B2 |   | 10/2013 | Murata et al. | |
| 2014/0060009 | A1 | | 3/2014 | Zhang et al. | |
| 2014/0069080 | A1 | | 3/2014 | Leone et al. | |
| 2014/0069380 | A1 | | 3/2014 | Leone et al. | |
| 2014/0196454 | A1 | | 7/2014 | Ulrey et al. | |

* cited by examiner

*Primary Examiner* — Erick R Solis
*Assistant Examiner* — Robert A Werner
(74) *Attorney, Agent, or Firm* — Geoffrey Brumbaugh; McCoy Russell LLP

(57) ABSTRACT

Methods and systems are provided for controlling and coordinating control of a post-catalyst exhaust back pressure valve and secondary air injection to expedite catalyst heating. By adjusting the exhaust back pressure valve to increase the exhaust backpressure and injecting secondary air into an exhaust passage upstream of the catalyst during cold start conditions, exhaust catalyst activation may be expedited.

17 Claims, 3 Drawing Sheets

METHOD AND SYSTEM FOR SECONDARY AIR INJECTION COORDINATION WITH EXHAUST BACK PRESSURE VALVE

FIELD

The present description relates to systems and methods for expediting heating of an exhaust catalyst utilizing secondary air injection in coordination with exhaust back pressure valve adjustment, in particular, during an engine cold start.

BACKGROUND AND SUMMARY

Engine cold-start emissions released before an exhaust catalyst has been sufficiently warmed may lower vehicle exhaust quality. Accordingly, engine control systems may use various approaches to expedite attainment of an activation temperature (e.g., a light-off temperature) at the exhaust catalyst.

One example approach involves increasing exhaust gas temperatures by operating the engine rich to generate high levels of engine-out carbon monoxide (CO), hydrogen ($H_2$), and hydrocarbons and at the same time pumping air (herein referred to as secondary air injection) into the exhaust manifold upstream of the exhaust catalyst. The air pumped into the exhaust manifold may react with the exhaust gases generating an exothermic reaction. As a result, rapid catalyst heating may be achieved. However, the inventors herein have recognized potential issues with such an approach. During secondary air injection, high levels of enrichment are required to increase the percentage of combustible gases in the exhaust, which reduces engine efficiency and increases particulate emissions. Further, high levels of spark retard are required to increase the temperature of the exhaust. As a result, combustion stability and/or engine efficiency may be degraded.

In one example, the above issues may be at least partly addressed by a method for an engine comprising: during an engine cold-start, adjusting an exhaust back pressure valve position based on a desired exhaust back pressure; determining an actual exhaust back pressure upstream of the valve; delivering a desired secondary air amount into an exhaust passage upstream of a catalyst based on the actual exhaust back pressure; and adjusting a fuel injection amount and a spark timing based on the actual back pressure.

As an example, during an engine cold start, while an engine temperature is below a threshold temperature, an exhaust back pressure valve coupled downstream of an exhaust catalyst may be adjusted to increase an exhaust back pressure upstream of the valve. At the same time, a secondary air pump may be operated to deliver secondary air into the exhaust manifold upstream of the catalyst. By using a post-catalyst exhaust back pressure valve, the time and temperature that a given mass of exhaust gas is in contact with catalyst parts are substantially increased, expediting catalyst activation. By utilizing secondary air injection in coordination with the exhaust back pressure, a more rapid heating of the exhaust catalyst may be achieved. Further, an amount of enrichment and an amount of spark retard that would be required when exhaust back pressure increase and secondary air injection are utilized coordinately for catalyst warm-up may be less than the fuel injection amount and the spark retard that would be required during secondary air injection alone. Consequently, by using less spark retard, efficiency and combustion stability may be improved, and by using less enrichment, particulate emissions and efficiency may be improved.

In this way, exhaust back pressure and secondary air injection can be advantageously used to expedite exhaust catalyst activation. The combination enables exhaust catalyst activation to be expedited without compromising combustion stability and efficiency. By rapidly heating the exhaust catalyst, cold-start exhaust emissions may be reduced.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

Figure 1:
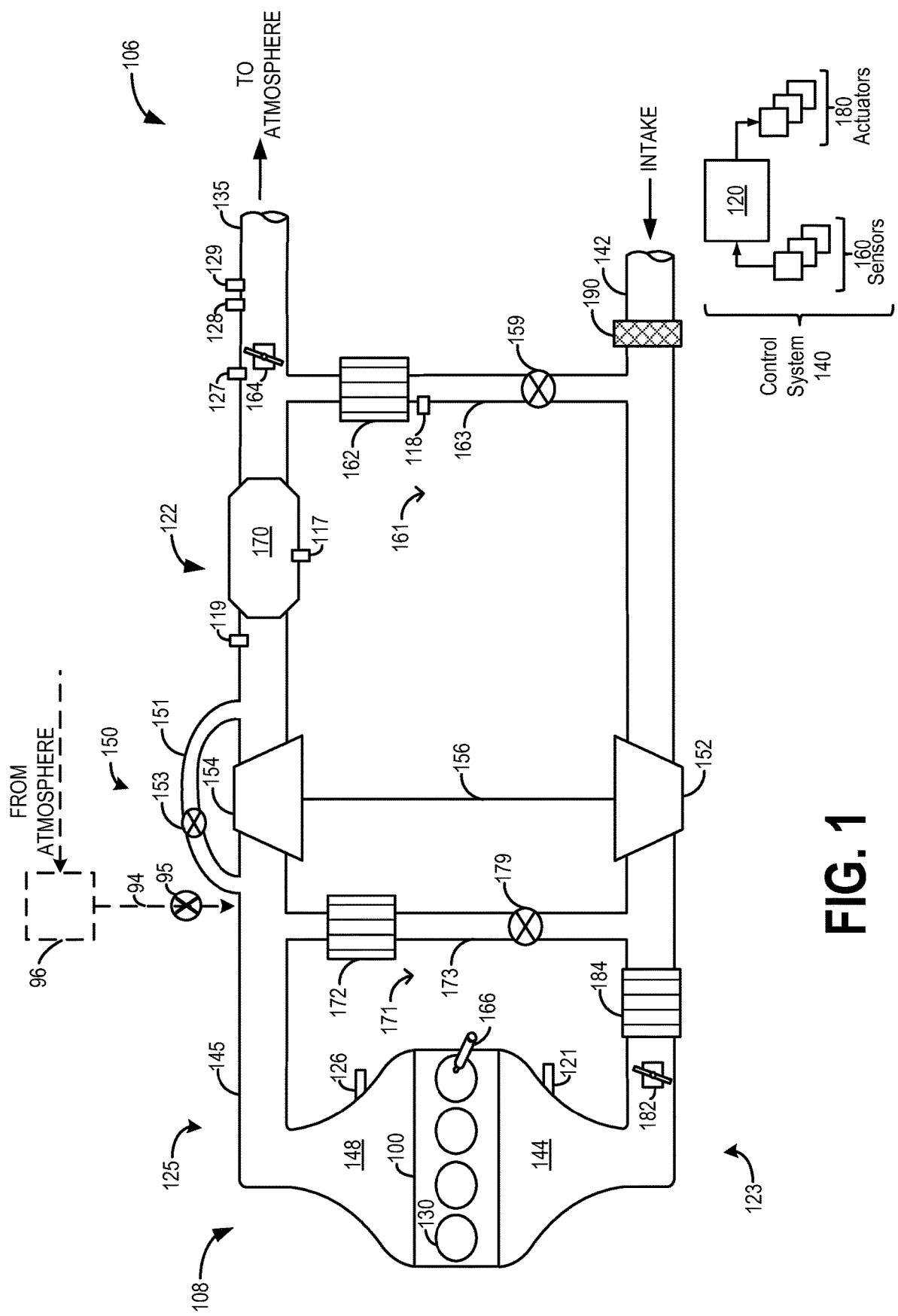
FIG. 1 shows a schematic depiction of an engine system.

Methods and systems are provided for expediting engine warm-up and catalyst activation in a vehicle engine, such as the engine system of FIG. 1. During an engine cold-start, exhaust backpressure and secondary air injection may be advantageously used to quickly raise a temperature of an exhaust catalyst. A controller may be configured to perform a control routine, such as the example routine of FIG. 2, to adjust an exhaust valve positioned downstream of an exhaust catalyst to raise an exhaust backpressure while delivering secondary air. By coordinately utilizing exhaust back pressure increase with secondary air injection, an amount of enrichment and spark retard required may be reduced. As a result, combustion stability, efficiency, and particulate emissions may be improved while achieving rapid catalyst heating. Example back pressure valve and secondary air injection amount adjustments are described at FIG. 3.

FIG. 1 shows a schematic depiction of a vehicle system 106. The vehicle system 106 includes an engine system 108, including engine 100 coupled to emission control system 122. Engine 100 includes a plurality of cylinders 130. Engine 100 also includes an intake 123 and an exhaust 125. Intake 123 may receive fresh air from the atmosphere through intake passage 142. Air entering intake passage 142 may be filtered by air filter 190. Intake passage 142 may include an air intake throttle 182 positioned downstream of an intake compressor 152 and an intake charge air cooler 184. Intake throttle 182 may be configured to adjust the flow of intake gas (e.g., boosted intake air) entering engine intake manifold 144. Exhaust 125 includes an exhaust manifold 148 leading to an exhaust passage 145 that routes exhaust gas to the atmosphere via tailpipe 135.

Engine 100 may be a boosted engine including a boosting device, such as turbocharger 150. Turbocharger 150 may include intake compressor 152, arranged along intake passage 142, and an exhaust turbine 154, arranged along exhaust passage 145. Compressor 152 may be at least partially driven by turbine 154 via shaft 156. The amount of boost provided by the turbocharger may be varied by an engine controller. Turbine bypass passage 151 controlled via wastegate 153 may be coupled across the exhaust turbine so that some or all of the exhaust gases flowing through exhaust passage 145 can bypass turbine 154. By adjusting the position of the wastegate, an amount of exhaust gas delivered through the turbine may be varied, thereby varying an amount of boost delivered to the engine intake.

In further embodiments, a similar bypass passage controlled via a bypass valve (not shown) may be coupled across the intake compressor so that some or all of the intake air compressed by compressor 152 can be recirculated into the intake passage 142 upstream of compressor 152. By adjusting the position of the compressor bypass valve, pressure in the intake system may be released during selected conditions to reduce the effects of compressor surge loading.

An optional charge air cooler 184 may be included downstream of compressor 152 in the intake passage to reduce the temperature of intake air compressed by the turbocharger. Specifically, after-cooler 184 may be included upstream of intake throttle 182 or integrated into the intake manifold 144.

Emission control system 122, coupled to exhaust passage 145, includes a catalyst 170. Catalyst 170 may include multiple catalyst bricks, in one example. In another example, multiple emission control devices, each with multiple bricks, can be used. Catalyst 170 can be a three-way type catalyst in one example. In other examples, catalyst 170 may be an oxidation catalyst, lean NOx trap, selective catalyst reduction (SCR) device, particulate filter, or other exhaust treatment device. While catalyst 170 is arranged downstream of turbine 154 in the embodiments described herein, in other embodiments, catalyst 170 may be arranged upstream of a turbocharger turbine or at another location in the engine exhaust passage without departing from the scope of this disclosure.

An exhaust throttle or an exhaust backpressure valve 164 may be located in the exhaust passage, downstream of exhaust catalyst 170. In the embodiments described herein, controller 120 may control a position of exhaust throttle 164 based on various engine operating conditions and parameter values (e.g., engine cold start, stored vacuum level, shutdown, etc.). In other embodiments, the exhaust back pressure valve, exhaust passage, and other components may be designed such that the exhaust throttle is mechanically controlled as needed during various engine operating conditions, without control system intervention. As elaborated with reference to FIG. 2, exhaust back pressure valve 164 may be selectively closed by controller 120 during engine cold-start conditions in coordination with secondary air injection delivered by secondary air pump 96 to rapidly raise an exhaust pressure and temperature. By throttling the exhaust flow, uncontrolled expansion at the engine exhaust valves is reduced, further raising an exhaust temperature and expediting activation of a downstream exhaust catalyst. Additionally, by pumping secondary air into the exhaust, more rapid heating of the exhaust catalyst may be achieved.

As such, the improvement in heat transfer to the engine and exhaust catalyst via throttling of the exhaust can be attributed to at least two effects. First, the higher density of the (slower moving) exhaust gas, due to the higher pressure of the exhaust gas, improves heat transfer per kilogram of the exhaust flow. Further, the expansion to atmosphere post-catalyst (e.g., post an exhaust three-way catalyst) delays the pressure-related temperature drop of the exhaust gas until downstream of the catalyst. In particular, by using a post-catalyst throttle, the time and temperature that a given mass of exhaust gas is in contact with catalyst parts is substantially increased. This expedites the catalyst activation. It will be appreciated that while the depicted embodiment achieves post catalyst expansion of the exhaust via an exhaust throttle, in alternate embodiments, the same may be achieved via a post-catalyst orifice in the engine exhaust passage 145.

Exhaust throttle 164 may be maintained in a fully open position (or wide open throttle) during most engine operating conditions, but may be configured to close to increase exhaust backpressure under certain conditions, as will be detailed below. In one embodiment, exhaust throttle 164 may have two restriction levels, fully open or fully closed. However, in an alternate embodiment, the position of exhaust throttle 164 may be variably adjustable to a plurality of restriction levels by controller 120.

As detailed herein, adjustments of exhaust throttle position may affect air flow through the engine. For example, a fully closed throttle may be conceptualized as a "potato in the tailpipe" which restricts exhaust flow, thereby causing an increase in exhaust backpressure upstream of the closed throttle. This increase in exhaust backpressure leads to a direct increase in exhaust temperature which may be advantageously used during selected conditions (e.g., during an engine cold-start) to expedite warming of exhaust catalyst 170. In some embodiments, while closing the exhaust throttle, spark timing may be retarded to further elevate exhaust temperatures, thereby further expediting catalyst activation.

To compensate for the effects of exhaust throttle adjustment on engine air flow, one or more other engine components may be adjusted. As an example, as the exhaust throttle closes, mass air flow may initially decrease, and thus an intake throttle (such as intake throttle 182) may be opened to admit more air to the engine to maintain engine speed and reduce torque fluctuation. In this way, while the exhaust throttle is used to manage backpressure, airflow may be controlled to limit an engine output torque. As another example, spark timing may be adjusted (e.g., advanced) while the throttle is closed to improve combustion stability. In some embodiments, valve timing adjustments may also be used (e.g., adjustments to an amount of valve overlap) in conjunction with throttle position adjustments to improve combustion stability. For example, intake and/or exhaust valve timings may be adjusted to adjust internal exhaust gas recirculation and increase combustion stability.

Vehicle system 106 may further include a low-pressure EGR (LP-EGR) system 161. LP-EGR system 161 includes an EGR passage 163 that couples exhaust passage 145, downstream of exhaust catalyst 170 and upstream of exhaust throttle 164, with air intake passage 142, upstream of compressor 152. An EGR cooler 162 arranged in EGR passage 163 cools exhaust gas flowing there-through, as will be detailed below. A position of EGR valve 159, located in EGR passage 163 on the intake passage side of EGR cooler 162, may be adjusted by controller 120 to vary an amount and/or rate of exhaust gas recirculated from the exhaust passage to the intake passage via the LP-EGR system. In some embodiments, one or more sensors may be positioned within LP-EGR passage 163 to provide an indication of one or more of a pressure, temperature, and air-fuel ratio of exhaust gas recirculated through the LP-EGR passage. For example, temperature sensor 118 may be coupled to an outlet (on the intake passage side) of EGR cooler 162 and may be configured to provide an estimate of an EGR cooler outlet temperature. Exhaust gas recirculated through LP-EGR passage 163 may be diluted with fresh intake air at a mixing point located at the junction of LP-EGR passage 163 and intake passage 242. Specifically, by adjusting a position of EGR valve 159, a dilution of the EGR flow may be adjusted.

As such, when EGR valve 159 is closed, at least a portion of exhaust gas may be directed through EGR cooler 162.

In some embodiments (as depicted), vehicle system 106 may further include a high-pressure EGR (HP-EGR) system 171. HP-EGR system 171 includes an EGR passage 173 that couples exhaust passage 145, upstream of turbine 154 with air intake passage 142, downstream of compressor 152 and upstream of charge air cooler 184 and intake throttle 182. An EGR cooler 172 arranged in EGR passage 173 cools exhaust gas flowing there-through. A position of EGR valve 179, located in EGR passage 173 on the intake passage side of EGR cooler 172, may be adjusted by controller 120 to vary an amount and/or rate of exhaust gas recirculated from the exhaust passage to the intake passage via the HP-EGR system. In some embodiments, one or more sensors may be positioned within HP-EGR passage 173 to provide an indication of one or more of a pressure, temperature, and air-fuel ratio of exhaust gas recirculated through the HP-EGR passage.

Engine 100 may be controlled at least partially by a control system 140 including controller 120 and by input from a vehicle operator via an input device (not shown). Control system 140 is configured to receive information from a plurality of sensors 160 (various examples of which are described herein) and sending control signals to a plurality of actuators 180. As one example, sensors 160 may include exhaust gas oxygen sensor 126 coupled to exhaust manifold 148, MAP sensor 121 coupled to intake manifold 144, exhaust catalyst temperature sensor 117, exhaust pressure sensor 119 located upstream of catalyst 170 in tailpipe 135, exhaust back pressure sensor 127 located upstream of the exhaust back pressure valve and downstream of catalyst 170, exhaust temperature sensor 128 and exhaust pressure sensor 129 located downstream of catalyst 170 in tailpipe 135, and vacuum sensor 192 arranged in vacuum reservoir 177. Various exhaust gas sensors may also be included in exhaust passage 145 downstream of catalyst 170, such as particulate matter (PM) sensors, NOx sensors, oxygen sensors, ammonia sensors, hydrocarbon sensors, etc. Other sensors such as additional pressure, temperature, air/fuel ratio and composition sensors may be coupled to various locations in the vehicle system 106. As another example, actuators 180 may include fuel injector 166, exhaust throttle 164, EGR valve 159, and intake throttle 182. Other actuators, such as a variety of additional valves and throttles, may be coupled to various locations in vehicle system 106. Controller 120 may receive input data from the various sensors, process the input data, and trigger the actuators in response to the processed input data based on instruction or code programmed therein corresponding to one or more routines. Example control routines are described herein with regard to FIG. 2. As further elaborated herein with reference to FIGS. 2-3, controller 120 may be configured to inject secondary air flow into the exhaust passage upstream of emission control device 170 to increase the exhaust temperature during selected engine operating conditions (e.g. during cold start conditions). An air pump 96 may be present to inject outside air (e.g., from the atmosphere) into the exhaust manifold 148 via injection line 94, which is controlled by valve 95. In one example, air pump 96 may deliver outside air into the exhaust passage 135 at a location downstream of the turbine and upstream of the catalyst.

As such, during cold start conditions secondary air injection may be utilized in coordination with exhaust back pressure adjustments (e.g., by adjusting exhaust back pressure valve 164) in order to expedite catalyst warm-up to the catalyst activation temperature. Further, when secondary air injection and exhaust back pressure adjustments are coordinately employed, a fuel injection amount and a spark timing may be adjusted based on an actual exhaust back pressure. As such, if secondary air injection alone is employed during cold start conditions (that is, with exhaust back pressure valve open), the engine may be operated with additional enrichment to increase the percentage of combustible gases in the exhaust. Further, an amount of spark retard from MBT may be increased to increase the temperature of the exhaust. As a result of high levels of enrichment and spark retard, engine efficiency, particulate emissions, and combustion stability may be degraded. By utilizing the combination of secondary air injection and exhaust back pressure adjustment during cold start conditions, the engine may be operated with less enrichment and less spark retard. Consequently, efficiency, emissions, and combustion stability may be improved while achieving rapid exhaust catalyst activation. Details of secondary air injection and exhaust back pressure adjustments will be further elaborated here with respect to FIGS. 2 and 3.

Figure 2:
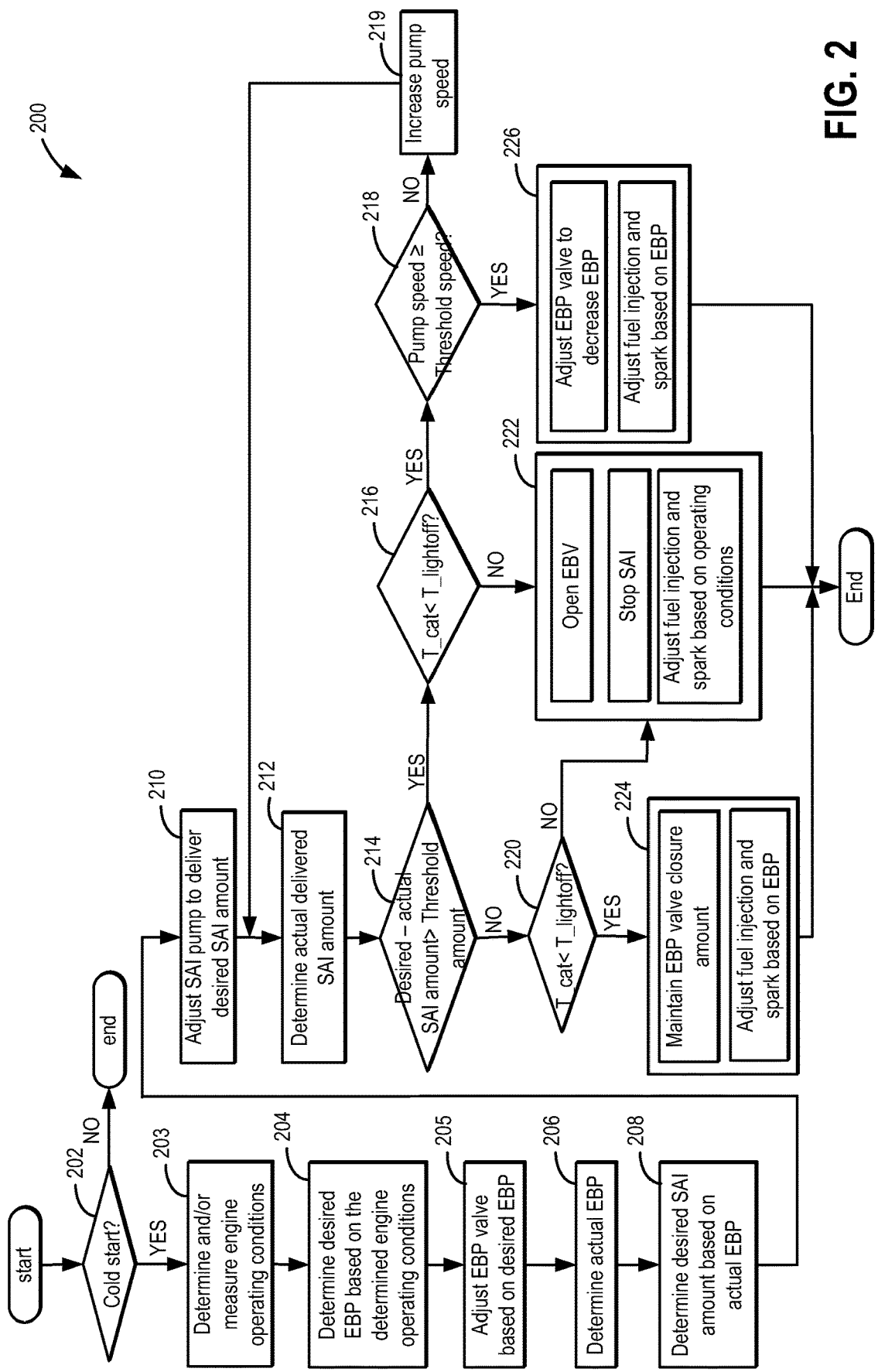
FIG. 2 shows a high level flow chart illustrating a routine that may be implemented for adjusting secondary air injection and an exhaust backpressure valve during an engine cold-start so as to expedite engine warm-up and catalyst activation.

Now turning to FIG. 2, routine 200 depicts a method for adjusting an exhaust backpressure valve (such as exhaust back pressure valve 164 at FIG. 1) and secondary air injection during an engine cold-start to expedite catalyst heating and activation.

At 202, method 200 includes confirming an engine cold-start. For example, it may be determined if an engine temperature (e.g., as inferred from an engine coolant temperature) is below a threshold. In another example, it may be determined if a temperature at an exhaust catalyst is below a threshold temperature, such as below an activation or light-off temperature. If not, the method may end.

Upon confirming an engine cold-start, the method may proceed to 203. At 203, method 200 includes determining and/or measure engine operating conditions. For example, the engine operating conditions may include an engine temperature, engine speed, an engine load, an ambient temperature, a barometric pressure, an exhaust temperature, an exhaust catalyst temperature, a duration of time since engine start, a maximum pump speed, a secondary air amount deliverable at the maximum pump speed, a battery state of charge, etc. Next at 204, the method may include determining a desired exhaust back pressure based on the determined engine operating conditions. Next, at 205, the controller may adjust an exhaust back pressure valve (EBP valve) opening amount based on the desired exhaust back pressure. As discussed at FIG. 1, the exhaust back pressure valve (or the exhaust throttle) may be located downstream of the exhaust catalyst. During cold start conditions, an exhaust back pressure opening amount may be decreased in order to increase the exhaust back pressure. The exhaust back pressure opening amount may be decreased by adjusting the exhaust back pressure valve to a more closed position. Consequently, an exhaust temperature may be increased. By increasing the exhaust temperature, a duration of time required for the exhaust catalyst to reach an activation temperature or light-off temperature may be reduced.

Upon adjusting the exhaust back pressure valve to achieve a desired exhaust back pressure, the method may proceed to 206. At 206, the controller may determine a current or actual exhaust back pressure. For example, the actual exhaust back pressure may be determined based on a pressure measurement from an exhaust back pressure sensor, such as sensor 127 at FIG. 1. As such, the exhaust back pressure sensor may be located upstream of the exhaust back pressure valve. Alternatively, the actual exhaust back pressure may be determined based on other measurements such as pressure in the EGR system(s), air flow rate at a given intake throttle opening, etc.

Next, at 208, method 200 includes determining a desired secondary air injection amount based on the actual exhaust back pressure. Secondary air may be utilized in addition to increasing the exhaust back pressure to reduce the duration of time required for the exhaust catalyst to attain the operating temperature during cold start conditions. Secondary air may be provided by operating an air pump such as air pump 96 at FIG. 1 to inject outside air (e.g., from the atmosphere) into the exhaust manifold 148 via injection line 94. The desired secondary air may be based on the amount of enrichment, engine airflow, duration of time since engine start, the exhaust temperature, and the exhaust catalyst temperature. For example, as the exhaust back pressure and the exhaust temperature increase, the desired amount of secondary air may decrease.

Upon determining the desired secondary air injection amount, method 200 may proceed to 210. At 210, the method includes adjusting a speed of the air pump to deliver the desired secondary air amount. The method may include adjusting a voltage, current, or pulse width supplied to an electric air pump, next, at 212, the method includes determining an actual secondary air amount delivered into the exhaust passage. The actual secondary air amount delivered may be determined based on a secondary air mass flow determined utilizing a secondary air mass flow sensor located in a secondary air injection line such as secondary air injection line 94 at FIG. 1. As such, for a given pump speed, the amount of secondary air delivered may decrease as the exhaust back pressure increases. Alternatively, the actual amount of secondary air delivered may be determined based on air pump speed, actual exhaust back pressure, etc.

Next, at 214, the method includes determining if a difference between the desired secondary air amount and the actual secondary air amount is greater than a threshold difference. If yes, method 200 may proceed to 216. At 216, the method includes determining if the exhaust catalyst temperature (T_cat) is below a threshold temperature, such as below the activation or the light-off temperature (T_lightoff). If the exhaust catalyst temperature is below the light-off temperature, the method may proceed to 218. At 218, the method includes determining if the secondary air pump is operating at or above a threshold speed. The threshold speed may be based on the difference between the desired secondary air amount and the actual secondary air amount, maximum pump speed, actual exhaust back pressure, and actual secondary air amount. If it is determined that the pump speed is not greater than the threshold speed, the method may proceed to 219. For example, if the pump speed is not greater than the threshold speed, it may be determined that the difference between the desired and actual secondary air amount may be decreased by increasing the pump speed. Accordingly, at 219, the method includes increasing the pump speed to increase the secondary air injection amount so as to bring the difference between the desired and actual secondary air amount below the threshold difference.

Returning to 218, if pump speed is less than the threshold speed, method 200 may proceed to 226. At 226, the method includes adjusting the exhaust back pressure valve to decrease the exhaust back pressure. For example, an opening of the exhaust back pressure valve may be increased to decrease the exhaust back pressure. The exhaust back pressure valve opening amount may be based on the difference between the desired and the actual secondary air injection amount. As such, as the difference increases, the exhaust back pressure valve opening amount may increase. For example, if the pump speed is greater than the threshold speed, it may be determined that the difference between the desired and actual secondary air amount may not be decreased by increasing the pump speed. That is, it may be determined that the secondary air pump may be unable to deliver the desired secondary air amount at the current exhaust back pressure. Therefore, the exhaust back pressure may be decreased. By decreasing the exhaust back pressure, secondary air injection amount delivered by the secondary air pump may be increased. Further at 226, the method includes adjusting a fuel injection amount and a spark timing based on the adjusted exhaust back pressure. For example, when the exhaust back pressure is above a threshold pressure, the fuel injection amount and an amount of spark retard may decrease with increasing exhaust back pressure. As such, the fuel injection amount and the amount of spark retard required when secondary air injection and exhaust back pressure adjustments are coordinately employed may be less than the fuel injection amount and the amount of spark retard required when secondary air injection is utilized without adjusting exhaust back pressure (that is, by maintaining exhaust back pressure valve in a fully open position). In other words, less enrichment and less spark retard may be required when exhaust back pressure and secondary air injection are utilized than when secondary air injection is utilized alone. As a result, efficiency, particulate emissions, and combustion stability may be improved while achieving faster exhaust catalyst activation when the combination of secondary air injection and exhaust back pressure adjustments are utilized.

Returning to 216, if the exhaust catalyst temperature has reached the activation or light-off temperature (that is, if T_cat≥T_lightoff), method 200 may proceed to 222. At 222, the method includes opening the exhaust back pressure valve and stopping secondary air injection. Further, upon the exhaust catalyst reaching the activation temperature, fuel injection and spark may be adjusted based on current engine operating conditions. The engine operating conditions may include engine speed, and load, for example.

Returning to 214, if the difference between the desired and actual secondary air amount is not greater than the threshold amount, method 200 may proceed to 220. At 220, the method may determine if the exhaust catalyst temperature (T_cat) is below a threshold temperature. If yes, the method may proceed to 224. At 224, the method includes maintaining the exhaust back pressure valve closing amount. For example, if the difference between the desired and actual secondary air amount is not greater than the threshold amount, it may be determined that the secondary air pump is able to deliver the desired secondary air amount at the current exhaust back pressure. Therefore, it may not be required to adjust the pump speed or the exhaust back pressure valve to obtain the desired secondary air amount until the catalyst light-off temperature is reached. In other words, the current secondary air injection amount and the exhaust back pressure may be maintained until the exhaust catalyst reaches the activation or light-off temperature. Further at 224, the method may include adjusting the fuel injection amount and the amount of spark retard based on the current exhaust back pressure. For example, as discussed above, when the exhaust back pressure is above the threshold pressure, the fuel injection amount and the amount of spark retard may decrease with increasing exhaust back pressure.

Returning to 220, if it is determined that the catalyst temperature is not below the activation or light-off temperature, the method may proceed to 222. At 222, the method includes, opening the exhaust back pressure valve, stopping secondary air injection, and adjusting fuel injection amount and spark based on engine operating conditions, as discussed above.

In this way, exhaust back pressure and secondary air injection may be coordinately adjusted to expedite heating of the exhaust catalyst during engine cold start operations. By coordinating exhaust back pressure with secondary air injection, the amount of spark retard and the amount of fuel injection may be reduced. Consequently, combustion stability, efficiency, and particulate emissions may be improved while achieving rapid catalyst activation.

In one example, a method for an engine may comprise: during an engine cold-start, adjusting an exhaust back pressure valve position based on a desired exhaust back pressure; determining an actual exhaust back pressure upstream of the valve; delivering a desired secondary air amount into an exhaust passage upstream of a catalyst based on the actual exhaust back pressure; and adjusting a fuel injection amount and a spark timing based on the actual back pressure. The delivering may be performed for a duration until a temperature of the exhaust catalyst is above a threshold temperature, and the desired exhaust back pressure may be based on one or more of an ambient temperature, an engine temperature, a barometric pressure, an engine speed, an engine load, an exhaust temperature, an exhaust catalyst temperature, a duration of time since engine start, a maximum pump speed, a secondary air amount deliverable at the maximum pump speed, and a battery state of charge. Further, the actual back pressure may be determined upstream of the exhaust back pressure valve and downstream of the catalyst. Adjusting the spark timing may include retarding the spark timing, an amount of spark retard based on the actual exhaust back pressure, and adjusting the fuel injection amount may include increasing the fuel injection amount, an amount of increase based on the actual exhaust back pressure.

Further, a difference amount between the desired secondary air amount and an actual secondary air amount may be determined. While the temperature of the exhaust catalyst is below the threshold temperature, the exhaust back pressure valve position and the secondary air pump speed may be maintained in response to the difference amount less than a threshold difference. While the temperature of the exhaust catalyst is below the threshold temperature, determining if the pump speed is greater than a threshold speed in response to the threshold amount greater than the threshold difference. Further, the exhaust back pressure valve position may be adjusted to decrease the actual exhaust back pressure in response to the pump speed greater than the threshold speed, and the spark timing and the fuel injection amount may be adjusted based on the decreased exhaust back pressure. The pump speed may be increased in response to the pump speed less than the threshold speed.

Still further, in response to the temperature of the exhaust catalyst greater than the threshold temperature, the exhaust back pressure valve position may be adjusted to an open position, the secondary air pump may be stopped, and a spark timing and a fuel injection amount may be adjusted based on one or more of an engine speed, and an engine load condition.

Figure 3:
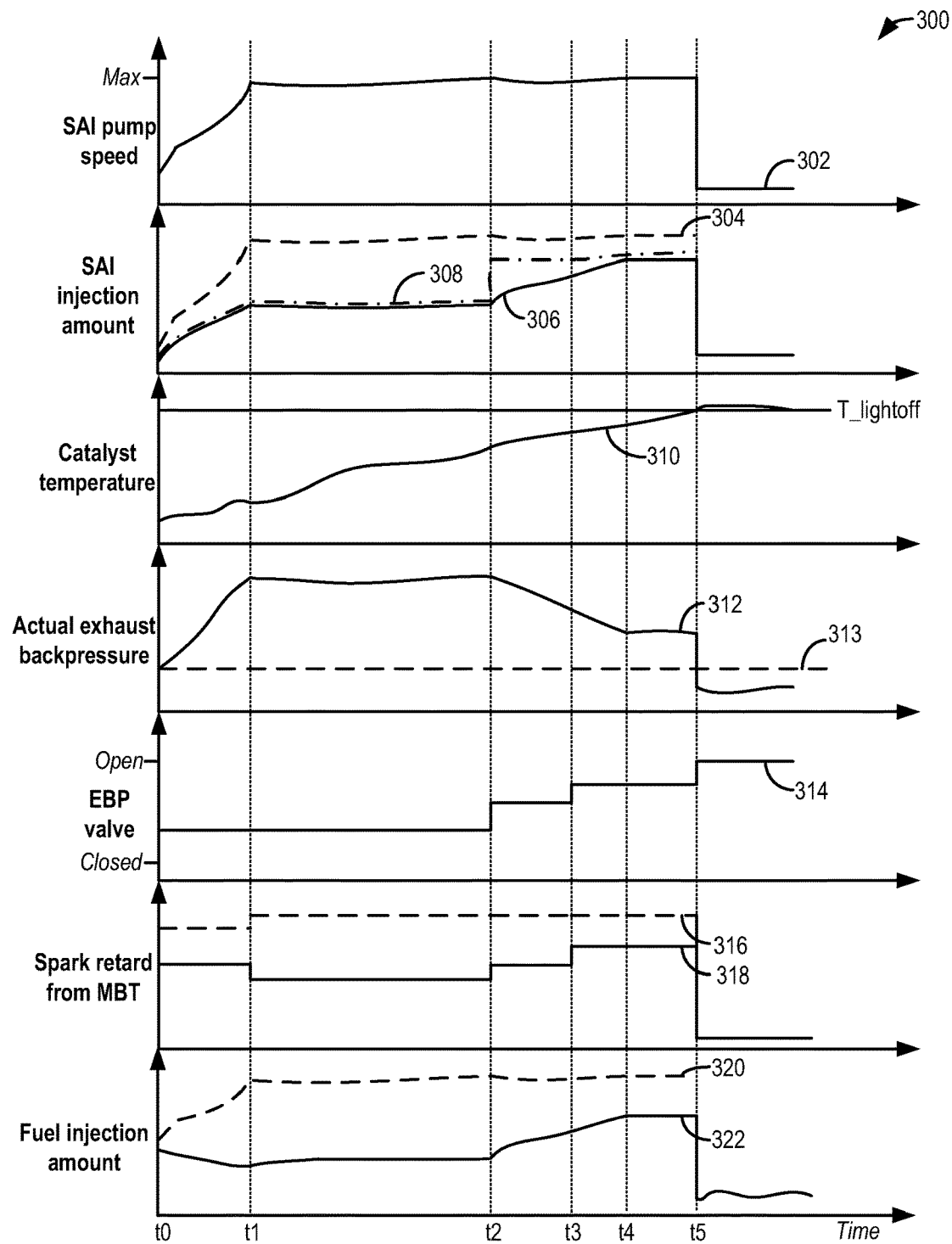
FIG. 3 shows an example exhaust backpressure valve and secondary air injection adjustment for expediting engine warm-up, according to the present disclosure.

Turning to FIG. 3, example adjustments of secondary air injection and exhaust back pressure during a cold start operation are shown. The sequence of FIG. 3 may be provided by executing instructions in the system of FIG. 1 according to the method of FIG. 2. Vertical markers at times t0-t5 represent times of interest during the sequence. Specifically, map 300 depicts secondary air injection pump speed at plot 302 and the pump speed increases in the direction of the Y axis arrow, an actual secondary air injection amount at plot 306 and the secondary air amount increases in the direction of the Y axis arrow, a desired secondary air injection amount at plot 308, a secondary air injection amount when exhaust backpressure is not utilized along with secondary air at plot 304, an exhaust catalyst temperature at plot 310 and the catalyst temperature increases in the direction of the Y axis arrow, an actual exhaust back pressure at plot 312 and the exhaust back pressure increases in the direction of the Y axis arrow, a threshold back pressure at 313, an exhaust back pressure valve condition at plot 314, spark retard during secondary air injection when exhaust backpressure is not employed at 316, spark retard when exhaust backpressure and secondary air injection are utilized at plot 318, fuel injection during secondary air injection when exhaust back pressure is not employed at plot 320, and fuel injection when exhaust back pressure and secondary air injection are utilized at plot 322. The X axis represents time and time increases from the left side of the plot to the right side of the plot.

At t0, an engine may be started. In particular, in response to the engine catalyst temperature (310) being below a threshold (T_light-off), an engine cold-start may be initiated at t0. During the engine cold-start, the engine may be restarted with the exhaust back pressure valve (314) in a more closed position. In the depicted example, the exhaust back pressure valve is adjusted to a more closed position. However, it must be appreciated that in some examples, the exhaust back pressure valve may be closed, or it may start in the open position and move to a more closed position soon after engine start. By adjusting the exhaust back pressure valve to a more closed position, an exhaust backpressure determined upstream (e.g., immediately upstream) of the exhaust back pressure valve increases (312). Consequently, the catalyst temperature also increases (310). Further, a secondary air pump may be operated (302) to deliver secondary air (e.g. from the atmosphere) into the exhaust manifold upstream of the catalyst. Consequently, the secondary air injection amount may increase (plot 306). As such, the secondary air injection amount may be based on the determined exhaust back pressure. While plot 306 shows secondary air injection amount based on exhaust back pressure, plot 304 shows secondary air injection amount that may be delivered at the depicted secondary air pump speed to achieve the depicted catalyst temperature increase (310) during cold start conditions when the exhaust back pressure is not utilized (e.g., when the exhaust back pressure valve is in an open position). For example, a higher secondary air injection amount may be required when exhaust back pressure is not utilized along with secondary air injection compared to operating conditions when the exhaust back pressure is utilized along with secondary air injection to reduce the time required for the exhaust catalyst to attain the activation or light-off temperature.

Further, spark timing may be retarded from MBT (318) and fuel injection amount (322) may be increased. The spark timing and the fuel injection amount may be adjusted based on the actual exhaust back pressure. For example, when the exhaust back pressure is above a threshold pressure (313), an amount of spark retard from MBT may decrease with increasing exhaust back pressure, and a fuel injection amount may decrease with increasing exhaust pressure. In one example, only the amount of spark retard may be adjusted based on the exhaust back pressure (e.g., less spark retard with increasing exhaust pressure). In another example, only the fuel injection amount may be adjusted based on the exhaust back pressure. For example, the fuel injection amount may be decreased with increasing exhaust pressure. In still another example, both spark retard and fuel injection may be adjusted based on exhaust back pressure. By using at least some spark retard, exhaust temperatures may be further increased, and catalyst activation may be further expedited. By using increased fuel injection amount (that is, higher enrichment), a percentage of combustible gases in the exhaust may be increased. As a result, exhaust temperature may be increased. As such the amount of spark retard from MBT and the fuel injection amount when secondary air and exhaust back pressure are utilized may be less than spark retard (316) and fuel injection amount (320) when only secondary air or exhaust back pressure is utilized. In this way, by utilizing secondary air injection and exhaust back pressure to expedite heating of the exhaust catalyst during cold start conditions, less spark retard and less fuel injection amount (that is, less enrichment) may be used. By utilizing less spark retard, combustion stability and efficiency may be improved, and by providing less enrichment, particulate emissions and efficiency may be improved.

At times between t0 and t1, exhaust back pressure may increase (312). In order to provide the desired secondary air, the secondary air pump speed may increase. Further, a difference between the desired and the actual secondary air amount may be less than a threshold difference, and the catalyst temperature may increase (310) but may remain below the light-off temperature. At times t1, and between t1 and t2, the secondary air pump may be operating at a maximum speed. Further, the difference between the desired and the actual secondary air amount may be less than the threshold difference. The catalyst temperature may increase and may continue to remain below the light-off temperature. The exhaust back pressure (312) may be higher than at time t0. Consequently, spark retard from MBT may be decreased (318), and the fuel injection amount may be decreased (322).

At time t2, the catalyst temperature may be less than the light-off temperature. Further, the difference between the desired and the actual secondary air amount may be greater than the threshold difference. For example, the desired secondary air amount may increase. However, the secondary air pump may be operating at its maximum speed (302). As a result, the secondary air supplied by the pump (306) at the given exhaust pressure may be less than the desired amount (308). Therefore, in order to provide the desired secondary air amount (that is, to reduce the difference between the desired and the actual secondary air amount to less than the threshold difference), the exhaust back pressure (312) may be decreased by increasing the opening of the exhaust back pressure valve (314). By reducing the exhaust back pressure, the secondary air pump operating at maximum speed may deliver a higher secondary air amount. As a result of reducing the exhaust back pressure, the amount of spark retard from MBT may be increased (318) and the fuel injection amount may be increased (322).

At times between t2 and t3, the exhaust back pressure valve may continue to be in the less closed position. Consequently, the exhaust back pressure may decrease (312). Further, the pump may be operating at its maximum speed. Due to reduced exhaust back pressure, the amount of secondary air delivered by the pump operating at its maximum speed may increase. Further, spark retard may increase and the fuel injection amount may increase. However, the spark retard (318) and fuel injection (322) amount may be less than spark retard (316) and enrichment (320) when only secondary air is utilized without increasing exhaust back pressure. The catalyst temperature may increase (310).

At time t3, and between t3 and t4, the catalyst temperature may increase. However, the catalyst temperature may remain lower than the light-off temperature. Further, the difference between the desired and the actual secondary air amount may be greater than the threshold difference. The exhaust back pressure valve (314) may be further opened to further decrease the exhaust back pressure (312). Consequently, the secondary air amount delivered by the pump (306) may increase. Further, spark retard and fuel injection may increase.

At time t4, and between t4 and t5, the catalyst temperature may increase and may remain below the light-off temperature. Further, the difference between the desired and the actual secondary air amount may be less than the threshold difference. Therefore, the exhaust valve opening amount may be maintained. That is, when it is determined that the secondary air pump is delivering the desired secondary air amount, the exhaust valve opening amount may be maintained.

At time t5, the catalyst temperature may reach the light-off temperature. Upon the catalyst reaching the light-off temperature, the exhaust back pressure valve may be opened (314) and the secondary air injection (306) may be stopped (e.g., by stopping the secondary air pump). Further, fuel injection and spark may be adjusted based on engine operating conditions.

In one example, during cold start conditions when the temperature of the exhaust catalyst is below the light-off temperature, a HP-EGR valve (such as valve 179 at FIG. 1) and/or a LP-EGR valve (such as valve 159 at FIG. 1) may be closed. In another example, during cold start conditions, the HP-EGR valve and/or the LP-EGR valve may be moved to a more closed position.

In this way, during cold start conditions, when a temperature of the exhaust catalyst is below the activation temperature, secondary air injection may be combined with exhaust back pressure adjustments to increase a temperature of the exhaust gas, thereby facilitating rapid heating of the exhaust catalyst. By combining secondary air injection and exhaust back pressure adjustments, the amount of enrichment and the amount of spark retard required may be less than the amount of enrichment and spark retard required when secondary air injection is used independently (that is, without exhaust back pressure). By utilizing less enrichment, particulate emissions and efficiency may be improved. By utilizing less spark retard, combustion stability and efficiency may be improved.

In one example, a method for an engine may comprise: during an engine cold-start, adjusting a first secondary air injection amount based on an exhaust back pressure; adjusting an exhaust back pressure valve to adjust the exhaust back pressure to a different back pressure; and adjusting a fuel injection amount and a spark timing based on the different back pressure to achieve a desired exhaust temperature, wherein adjusting the fuel injection amount includes increasing the fuel injection amount as the different back pressure decreases, and wherein adjusting the spark timing includes increasing an amount of spark retard as the different back pressure decreases. Further, adjusting to a different value may be based on a difference between the first secondary air injection amount and a second secondary air injection amount greater than a threshold difference, the second secondary air injection amount determined based on a secondary mass air flow sensor reading. Adjusting the first secondary air injection amount may include adjusting a speed of a secondary air pump, the secondary air pump speed based on the different back pressure. The exhaust back pressure is based on one or more of an ambient temperature, an engine temperature, a barometric pressure, an engine speed, an engine load, an exhaust temperature, an exhaust catalyst temperature, a duration of time since engine start, a maximum pump speed, a secondary air amount deliverable at the maximum pump speed, and a battery state of charge.

Further, while a temperature of an exhaust catalyst is less than a threshold temperature, the first secondary air injection amount, the exhaust back pressure valve, the fuel injection amount and the spark timing may be adjusted. In response to the catalyst temperature greater or equal to the threshold temperature, the exhaust back pressure valve may be adjusted to an open position; and the secondary air pump speed may be adjusted to zero.

In another example, a method for an engine may comprise: during an engine cold-start, determining a first exhaust back pressure; determining a desired secondary air injection amount based on the first back pressure; determining a difference between the desired secondary air injection amount and an actual secondary air amount; adjusting an exhaust back pressure valve to achieve a second exhaust back pressure based on the difference greater than a threshold difference; and adjusting a fuel injection amount and a spark timing based on the second back pressure, wherein the second exhaust back pressure is less than the first exhaust back pressure, and wherein adjusting the fuel injection amount and the spark timing includes increasing the fuel injection amount and increasing an amount of spark retard in response to the second back pressure below a threshold back pressure.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine comprising:
during an engine cold-start, adjusting an exhaust back pressure valve position based on a desired exhaust back pressure;
determining an actual exhaust back pressure upstream of the valve;
delivering a desired secondary air amount into an exhaust passage upstream of a catalyst based on the actual exhaust back pressure;
adjusting a spark retard amount based on the actual back pressure; and
increasing a fuel injection amount based on the actual back pressure.

2. The method of claim 1, wherein the delivering is performed for a duration until a temperature of the exhaust catalyst is above a threshold temperature, and wherein the desired exhaust back pressure is based on one or more of an ambient temperature, an engine temperature, a barometric pressure, an engine speed, an engine load, an exhaust temperature, an exhaust catalyst temperature, a duration of time since engine start, a maximum pump speed, a secondary air amount deliverable at the maximum pump speed, and a battery state of charge.

3. The method of claim 2, wherein the actual back pressure is determined upstream of the exhaust back pressure valve and downstream of the catalyst.

4. The method of claim 2, further comprising determining a difference amount between the desired secondary air amount and an actual secondary air amount.

5. The method of claim 4, further comprising, while the temperature of the exhaust catalyst is below the threshold temperature, maintaining the exhaust back pressure valve position and the secondary air pump speed while the difference amount is less than a threshold difference.

6. The method of claim 4, further comprising, while the temperature of the exhaust catalyst is below the threshold temperature, determining if a pump speed is greater than a threshold speed in response to the difference amount being greater than a threshold difference.

7. The method of claim 6, further comprising adjusting the exhaust back pressure valve position to decrease the actual exhaust back pressure in response to the pump speed being greater than the threshold speed, and adjusting the spark retard amount and the fuel injection amount based on the decreased exhaust back pressure.

8. The method of claim 6, further comprising increasing the pump speed in response to the pump speed being less than the threshold speed.

9. The method of claim 2, further comprising, in response to the temperature of the exhaust catalyst being greater than the threshold temperature, adjusting the exhaust back pressure valve position to an open position, stopping a secondary air pump, and adjusting the spark retard amount and the fuel injection amount based on one or more of an engine speed and an engine load condition.

10. A method for an engine, comprising:
during an engine cold-start,
adjusting a first secondary air injection amount based on an exhaust back pressure;
adjusting an exhaust back pressure valve to adjust the exhaust back pressure to a different back pressure; and
adjusting a fuel injection amount and a spark timing based on the different back pressure to achieve a desired exhaust temperature; wherein
adjusting the fuel injection amount includes increasing the fuel injection amount as the different back pressure decreases, and wherein adjusting the spark timing includes increasing an amount of spark retard as the different back pressure decreases.

11. The method of claim 10, wherein adjusting to the different back pressure is based on a difference between the first secondary air injection amount and a second secondary air injection amount being greater than a threshold difference, the second secondary air injection amount determined based on a secondary mass air flow sensor reading.

12. The method of claim 11, wherein adjusting the first secondary air injection amount includes adjusting a speed of a secondary air pump, the secondary air pump speed based on the different back pressure.

13. The method of claim 12, wherein the exhaust back pressure is based on one or more of an ambient temperature, an engine temperature, a barometric pressure, an engine speed, an engine load, an exhaust temperature, an exhaust catalyst temperature, a duration of time since engine start, a maximum pump speed, a secondary air amount deliverable at the maximum pump speed, and a battery state of charge.

14. The method of claim 13, wherein adjusting the first secondary air injection amount, the exhaust back pressure valve, the fuel injection amount and the spark timing is performed while a temperature of an exhaust catalyst is less than a threshold temperature.

15. The method of claim 14, further comprising adjusting the exhaust back pressure valve to an open position; and adjusting the secondary air pump speed to zero in response to the catalyst temperature being greater or equal to the threshold temperature.

16. A method for an engine comprising:
during an engine cold-start, determining a first exhaust back pressure;
determining a desired secondary air injection amount based on the first back pressure;
determining a difference between the desired secondary air injection amount and an actual secondary air amount;
adjusting an exhaust back pressure valve to achieve a second exhaust back pressure based on the difference being greater than a threshold difference; and
adjusting a fuel injection amount and a spark timing based on the second back pressure; wherein
the second exhaust back pressure is less than the first exhaust back pressure.

17. The method of claim 16, wherein adjusting the fuel injection amount and the spark timing includes increasing the fuel injection amount and increasing an amount of spark retard in response to the second back pressure being below a threshold back pressure.

* * * * *